(12) United States Patent
Zhou

(10) Patent No.: US 11,928,598 B2
(45) Date of Patent: Mar. 12, 2024

(54) METHOD AND SYSTEM FOR DISTRIBUTED NEURAL NETWORK TRAINING

(71) Applicant: ALIBABA GROUP HOLDING LIMITED, Grand Cayman (KY)

(72) Inventor: Qinggang Zhou, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 895 days.

(21) Appl. No.: 16/662,981

(22) Filed: Oct. 24, 2019

(65) Prior Publication Data
US 2021/0125032 A1  Apr. 29, 2021

(51) Int. Cl.
*G06N 3/082* (2023.01)
*G06N 3/08* (2023.01)

(52) U.S. Cl.
CPC .............. *G06N 3/082* (2013.01); *G06N 3/08* (2013.01)

(58) Field of Classification Search
CPC ................................ G06N 3/082; G06N 3/08
USPC .......................................................... 706/15
See application file for complete search history.

(56) References Cited

U.S. PATENT DOCUMENTS

| | | | | |
|---|---|---|---|---|
| 11,328,222 | B1 * | 5/2022 | Matthews | H04L 49/3027 |
| 2018/0307972 | A1 * | 10/2018 | Feng | G06F 12/1009 |
| 2021/0374503 | A1 * | 12/2021 | Kim | H03M 7/702 |

OTHER PUBLICATIONS

Zinkevich et al., "Parallelized Stochastic Gradient Descent", NIPS 2010 (Year: 2010).*
Dean et al., "Large Scale Distributed Deep Networks," https://www.cs.toronto.edu/~ranzato/publications/DistBeliefNIPS2012_withAppendix.pdf, pp. 1-11 (2012).
Goyal et al., "Accurate, Large Minibatch SGD: Training ImageNet in 1 Hour," https://arxiv.org/abs/1706.02677, pp. 1-12 (2017).
Jia et al., "Highly Scalable Deep Learning Training System with Mixed-Precision: Training ImageNet in Four Minutes," https://arxiv.org/pdf/1807.11205.pdf, pp. 1-9 (2018).
Lin et al., "Don't Use Large Mini-Batches, Use Local SGD," https://arxiv.org/abs/1808.07217, 35 pages (2018).
Mikami et al., "Massively Distributed SGD: ImageNet/ResNet-50 Training in a Flash," https://arxiv.org/pdf/1811.05233.pdf, 7 pages (2018).
Niu et al., "Hogwild !: A Lock-Free Approach to Parallelizing Stochastic Gradient Descent," https://arxiv.org/abs/1106.5730, pp. 1-22 (2011).

(Continued)

*Primary Examiner* — Tsu-Chang Lee
(74) *Attorney, Agent, or Firm* — Finnegan, Henderson, Farabow, Garrett & Dunner, LLP

(57) ABSTRACT

The present disclosure discloses a system and method for distributed neural network training. The method includes: computing, by a plurality of heterogeneous computation units (HCUs) in a neural network processing system, a first plurality of gradients from a first plurality of samples; aggregating the first plurality of gradients to generate an aggregated gradient; computing, by the plurality of HCUs, a second plurality of gradients from a second plurality of samples; aggregating, at each of the plurality of HCUs, the aggregated gradient with a corresponding gradient of the second plurality of gradients to generate a local gradient update; and updating, at each of the plurality of HCUs, a local copy of a neural network with the local gradient update.

21 Claims, 11 Drawing Sheets

(56) References Cited

OTHER PUBLICATIONS

Ying et al., "Image Classification at Supercomputer Scale," https://arxiv.org/pdf/1811.06992.pdf, 8 pages (2018).
Zhang et al., "Parallel SGD: When does averaging help?" https://arxiv.org/abs/1606.07365, pp. 1-13 (2016).
Zhou et al., "A Distributed Hierarchical Averaging SGD Algorithm: Trading Local Reductions for Global Reductions," https://arxiv.org/abs/1903.05133, pp. 1-38 (2019).

* cited by examiner

METHOD AND SYSTEM FOR DISTRIBUTED NEURAL NETWORK TRAINING

BACKGROUND

Machine learning (ML) or deep learning (DL) has been growing exponentially in the last decade. ML and DL use neural networks, which are mechanisms that basically mimic how a human brain learns. These neural networks can often use large data sets, resulting in a very time-consuming training process.

To facilitate the training process, large-scale distributed neural network training has been proposed and utilized. Large-scale distributed neural network training is to scale a batch Stochastic Gradient Descent (SGD) training task with a large batch size to a large number of machines (e.g., servers). A large batch size is helpful in speeding up the training. But due to the statistical characteristics of batch SGD, if the batch size is larger than a limit, final accuracy of the converged neural network may suffer. A number of techniques have been used to alleviate this negative impact on the accuracy of the converged neural network, which have increased the limit of the batch size. However, this limit cannot be increased indefinitely and is currently bounded.

Moreover, as the batch SGD training tasks are distributed to a large number of machines, computation time has been reduced, but communication time has been increased. Therefore, the large-scale distributed neural network training is significantly bounded to communication.

SUMMARY

Embodiments of the present disclosure relate to a neural network processing system and a method implemented by a neural network processing system.

In some embodiment, an exemplary method includes computing, by a plurality of heterogeneous computation units (HCUs), a first plurality of gradients from a first plurality of samples, and aggregating the first plurality of gradients to generate an aggregated gradient. The plurality of HCUs can be included in a neural network processing system. The method can include computing, by the plurality of HCUs, a second plurality of gradients from a second plurality of samples. The method can also include, at each of the plurality of HCUs, aggregating the aggregated gradient with a corresponding gradient of the second plurality of gradients to generate a local gradient update, and updating a local copy of a neural network with the local gradient update.

In some embodiment, a neural network processing system can include a network connection and a plurality of HCUs communicatively coupled to the network connection. The plurality of HCUs can be configured to compute a first plurality of gradients from a first plurality of samples. The first plurality of gradients are aggregated to generate an aggregated gradient. The plurality of HCUs can be configured to compute a second plurality of gradients from a second plurality of samples. Each of the plurality of HCUs can aggregate the aggregated gradient with its corresponding gradient of the second plurality of gradients to generate a local gradient update, and update its local copy of a neural network with the local gradient update.

In some embodiments, an exemplary non-transitory computer readable storage media stores a set of instructions. The instructions are executable by one or more processing devices in a neural network processing system comprising a plurality of HCUs, to cause the neural network processing system to perform a method comprising: computing a first plurality of gradients from a first plurality of samples, aggregating the first plurality of gradients to generate an aggregated gradient, computing a second plurality of gradients from a second plurality of samples, aggregating, at each of the plurality of HCUs, the aggregated gradient with a corresponding gradient of the second plurality of gradients to generate a local gradient update, and updating, at each of the plurality of HCUs, a local copy of a neural network with the local gradient update.

In some embodiments, an exemplary terminal can include: a host unit and a plurality of heterogeneous computation units (HCUs) communicatively coupled to the host unit. The plurality of HCUs can be configured to: compute a first plurality of gradients from a first plurality of samples, wherein the first plurality of gradients are aggregated to generate an aggregated gradient; compute a second plurality of gradients from a second plurality of samples; aggregate, at each of the plurality of HCUs, the aggregated gradient with a corresponding gradient of the second plurality of gradients to generate a local gradient update; and update, at each of the plurality of HCUs, a local copy of a neural network with the local gradient update.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
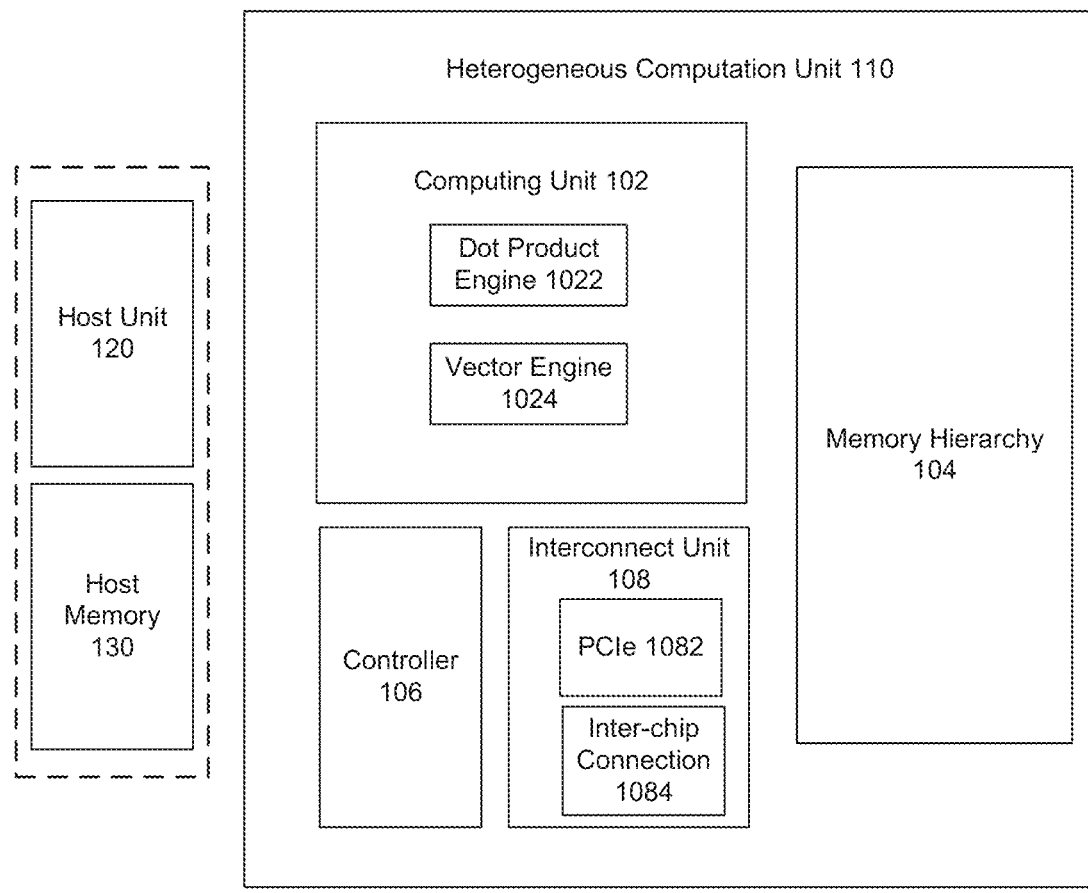
FIG. 1A illustrates an exemplary neural network processing architecture, according to some embodiments of the disclosure.

FIG. 1A illustrates an exemplary neural network processing architecture 100, according to some embodiments of the disclosure. As shown in FIG. 1A, architecture 100 can include a heterogeneous computation unit (HCU) 110 and a corresponding host unit 120 and host memory 130, and the like. It is appreciated that, HCU 110 can be a special-purpose computing device for facilitating neural network computing tasks. For example, HCU 110 can perform algorithmic operations (e.g., machine learning operations) based on communicated data. HCU 110 can be an accelerator, such as a Neural network Processing Unit (NPU), a Graphics Processing Unit (GPU), a Tensor Processing Unit (TPU), a Central Processing Unit (CPU), an Application Specific Integrated Circuit (ASIC), a Field Programmable Gate Array (FPGA), or the like.

HCU 110 can include one or more computing units 102, a memory hierarchy 104, a controller 106 and an interconnect unit 108. Each computing unit 102 can read data from and write data into memory hierarchy 104, and perform algorithmic operations (e.g., multiplication, addition, multiply-accumulate, etc.) on the data. In some embodiments, computing unit 102 can include a plurality of engines for performing different operations. For example, as shown in FIG. 1A, computing unit 102 can include a dot product engine 1022, a vector engine 1024, and the like. Dot product engine 1022 can perform dot product operations such as multiplication and convolution. Vector engine 1024 can perform vector operations such as addition.

Memory hierarchy 104 can have on-chip memory blocks (e.g., 4 blocks of 8 GB second generation of high bandwidth memory (HBM2)) to serve as main memory. Memory hierarchy 104 can store data and instructions, and provide other components, such as computing unit 102 and interconnect 108, with high speed access to the stored data and instructions.

Interconnect unit 108 can communicate data between HCU 110 and other external components, such as host unit or another HCU. Interconnect unit 108 can include a peripheral component interconnect express (PCIe) interface 1082 and an inter-chip connection 1084. PCIe interface 1082 provides communication between HCU and host unit 120 or EtherNet. Inter-chip connection 1084 servers as an inter-chip bus, connecting the HCU with other devices, such as other HCUs, the off-chip memory or peripherals.

Controller 106 can control and coordinate the operations of other components such as computing unit 102, interconnect unit 108 and memory hierarchy 104. For example, controller 106 can control dot product engine 1022 or vector engine 1024 in computing unit 102 and interconnect unit 108 to facilitate the parallelization among these components.

Host memory 130 can be off-chip memory such as a host CPU's memory. For example, host memory 130 can be a DDR memory (e.g., DDR SDRAM) or the like. Host memory 130 can be configured to store a large amount of data with slower access speed, compared to the on-chip memory integrated within one or more processors, acting as a higher-level cache.

Host unit 120 can be one or more processing units (e.g., an X86 central processing unit (CPU)). In some embodiments, a host system having host unit 120 and host memory 130 can comprise a compiler (not shown). The compiler is a program or computer software that transforms computer codes written in one programming language into instructions for HCU 110 to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

Figure 1B:
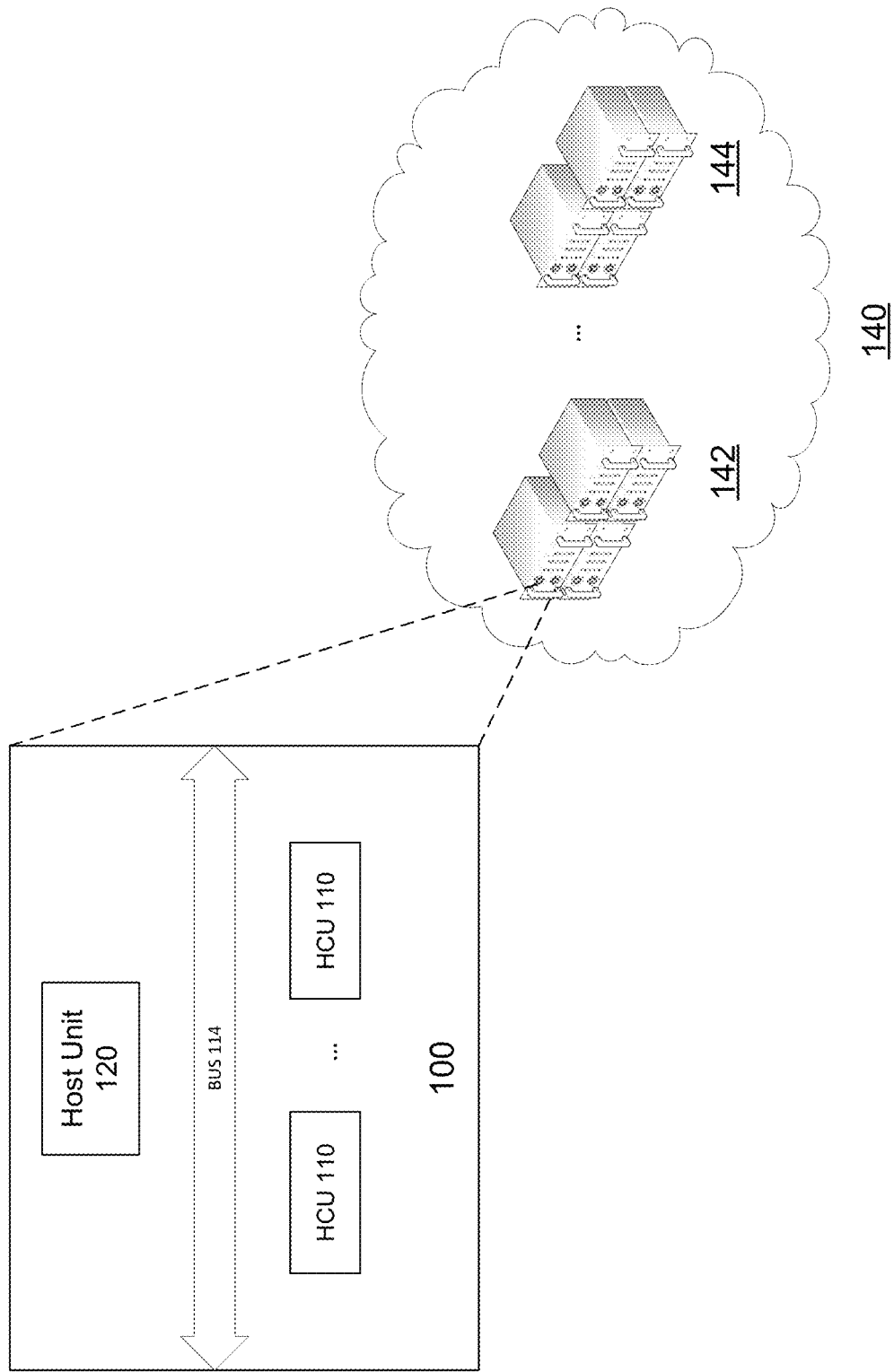
FIG. 1B illustrates a schematic diagram of an exemplary cloud system incorporating a neural network processing architecture, according to some embodiments of the disclosure.

FIG. 1B illustrates a schematic diagram of an exemplary cloud system 140 incorporating neural network processing architecture 100, according to embodiments of the disclosure.

As shown in FIG. 1B, cloud system 140 can provide cloud service with artificial intelligence (AI) capabilities, and can include a plurality of computing servers (e.g., 142 and 144). In some embodiments, a computing server 142 can, for example, incorporate neural network processing architecture 100 of FIG. 1A. Neural network processing architecture 100 is shown in FIG. 1B in a simplified manner for simplicity and clarity.

With the assistance of neural network processing architecture 100, cloud system 140 can provide the extended AI capabilities of image recognition, facial recognition, translations, 3D modeling, and the like.

It is appreciated that, neural network processing architecture 100 can be deployed to computing devices in other forms. For example, neural network processing architecture 100 can also be integrated in a computing device, such as a smart phone, a tablet, and a wearable device.

Moreover, while a specific architecture is shown in FIGS. 1A-1B, it is appreciated that any HCU or any accelerator that provides the ability to perform parallel computation can be used.

Figure 2:
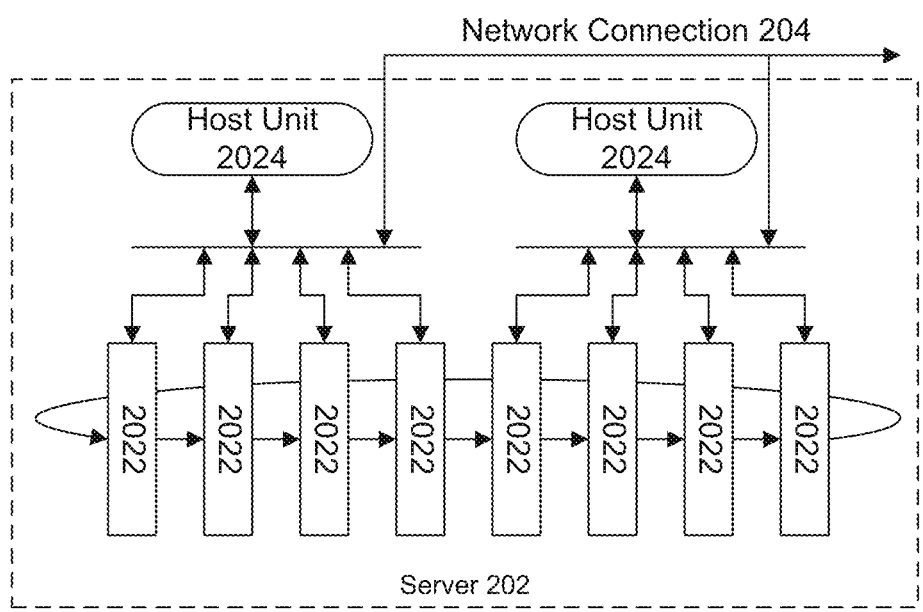
FIG. 2 illustrates a schematic diagram of an exemplary neural network processing system, according to some embodiments of the disclosure.

FIG. 2 illustrates a schematic diagram of an exemplary neural network processing system 200, according to embodiments of the disclosure. As shown in FIG. 2, the neural network processing system 200 can include a server (or worker) 202 and a network connection 204. Server 202 can include one or more HCUs 2022, which can be similar to HCU 110 described above in FIGS. 1A-1B, and a host unit 2024. HCU 2022 in the same server can be coupled and thus communicate with each other. For example, a plurality of HCUs 2022 in server 202 can be coupled as a ring and communicate with each other via the ring, as shown in FIG. 2. While one server is shown in FIG. 2, it is appreciated that more than one server can be provided in neural network processing system 200.

Host unit 2024 can be one or more processing units (e.g., a CPU). In some embodiments, a host system includes host unit 2024 and a host memory (not shown). Host unit 2024 can be implemented as host unit 120 as shown in FIGS. 1A-1B. While two host units 2024 are shown in FIG. 2, it is appreciated that server can include any number of host units. Each HCU 2022 can be communicatively coupled to one of host units 2024 via PCIe interface (e.g., PCIe interface 1082 in FIG. 1A) or a connection such as bus (e.g., bus 114 in FIG. 1B). Therefore, each HCU 2022 can communicate data and instructions with host unit 2024.

Network connection 204 can be an on-chip or off-chip connection structure. In some embodiments, network connection 204 can include a rack switch (not shown). Network connection 204 can be located on the host unit side, and communicatively coupled to host units 2024 and HCUs 2022 via a bus, as shown in FIG. 2. HCUs 2022 in server 202 can communicate with HCUs of other servers via network connection 204.

Figure 3:
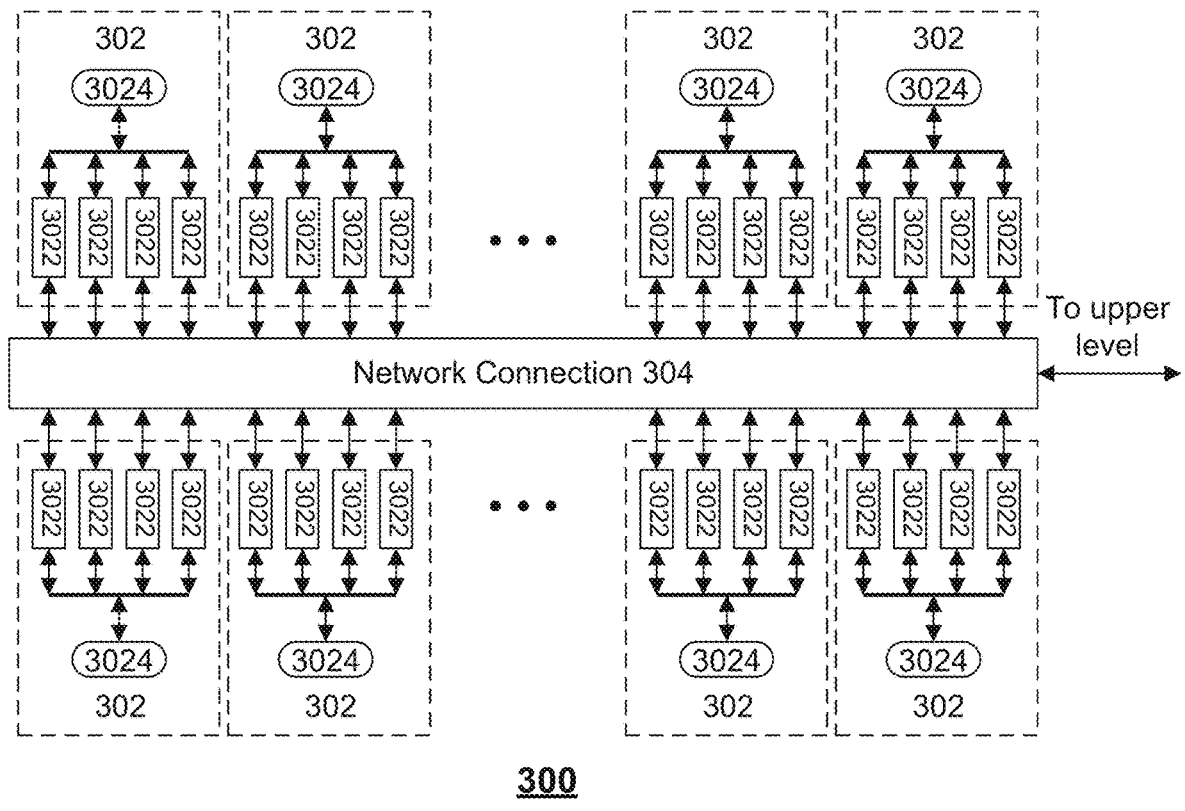
FIG. 3 illustrates a schematic diagram of another exemplary neural network processing system, according to some embodiments of the disclosure.

FIG. 3 illustrates a schematic diagram of another exemplary neural network processing system 300, according to embodiments of the disclosure. Similar to the neural network processing system 200 of FIG. 2, as shown in FIG. 3, the neural network processing system 300 can also include a plurality of servers 302 and a network connection 304. Each server 302 can include one or more HCUs 3022 and one or more host units 3024.

Unlike FIG. 2, network connection 304 is not located on the host unit side. HCUs 3022 in the same server can be coupled directly to network connection 304, and thus communicate with each other, with HCUs in other servers as well as with components in upper levels. In some embodiments, network connection 304 can include a rack switch (not shown).

The systems and architectures as shown in FIG. 1A, FIG. 1B, FIG. 2, and FIG. 3 can be used to process a neural network, including training the neural network and applying the neural network to many AI scenarios such as image recognition, facial recognition, translations, 3D modeling, and the like.

Generally, a neural network can use examples and labels to learn how to map specific sets of input data to output data. The input data includes observations or examples from a domain that describe conditions. The output data captures what the neural network thinks the observation means. The label for the input captures what the observation is expected.

A neural network with a specific set of weights can be evaluated against training data. An output of the neural network is compared to expected observation (or label) and an error is calculated. An update to the weights is made based on a gradient of the error (hereinafter, also referred to as error gradient, or shortly gradient).

Finding weights of a neural network involves repeating the steps of evaluating the neural network and updating the weights using error gradients. This process is repeated until a set of weights is found that is good enough or this process gets stuck.

Backpropagation (BP) refers to a technique of training a neural network. Backpropagation generally can be a backward computational process, including calculating gradients of errors for specific weights, and allowing the weights to be updated to move down the gradient. Moreover, forward propagation (FP) refers to a forward computational process of a neural network for starting from inputs and computing its outputs.

Backpropagation can include a Stochastic Gradient Descent (SGD) process to update weights with error gradients. SGD can be determined based on the following:

$$w_{t+1} = w_t - \lambda \nabla L(x, w_t),$$

where $w_t$ and $w_{t+1}$ are weights before updating and after updating, $\nabla L(x, w_t)$ is the error gradient, and $\lambda$ is the learning rate that is pre-defined and controls a speed of the update.

Batch SGD (or Mini-batch SGD, hereinafter, collectively referred to as batch SGD) is a variant of SGD and can be determined based on the following:

$$w_{t+1} = w_t - \lambda \frac{1}{B} \sum_{i=1}^{B} \nabla L(x_i, w_t),$$

where B is a batch size, representing the number of examples used to estimate the error gradient before updating the weights. Batch SGD assists with the ability to assign calculation of the gradients on many servers (or workers) since calculation of a gradient from an example is independent to calculation of others.

Figure 4:
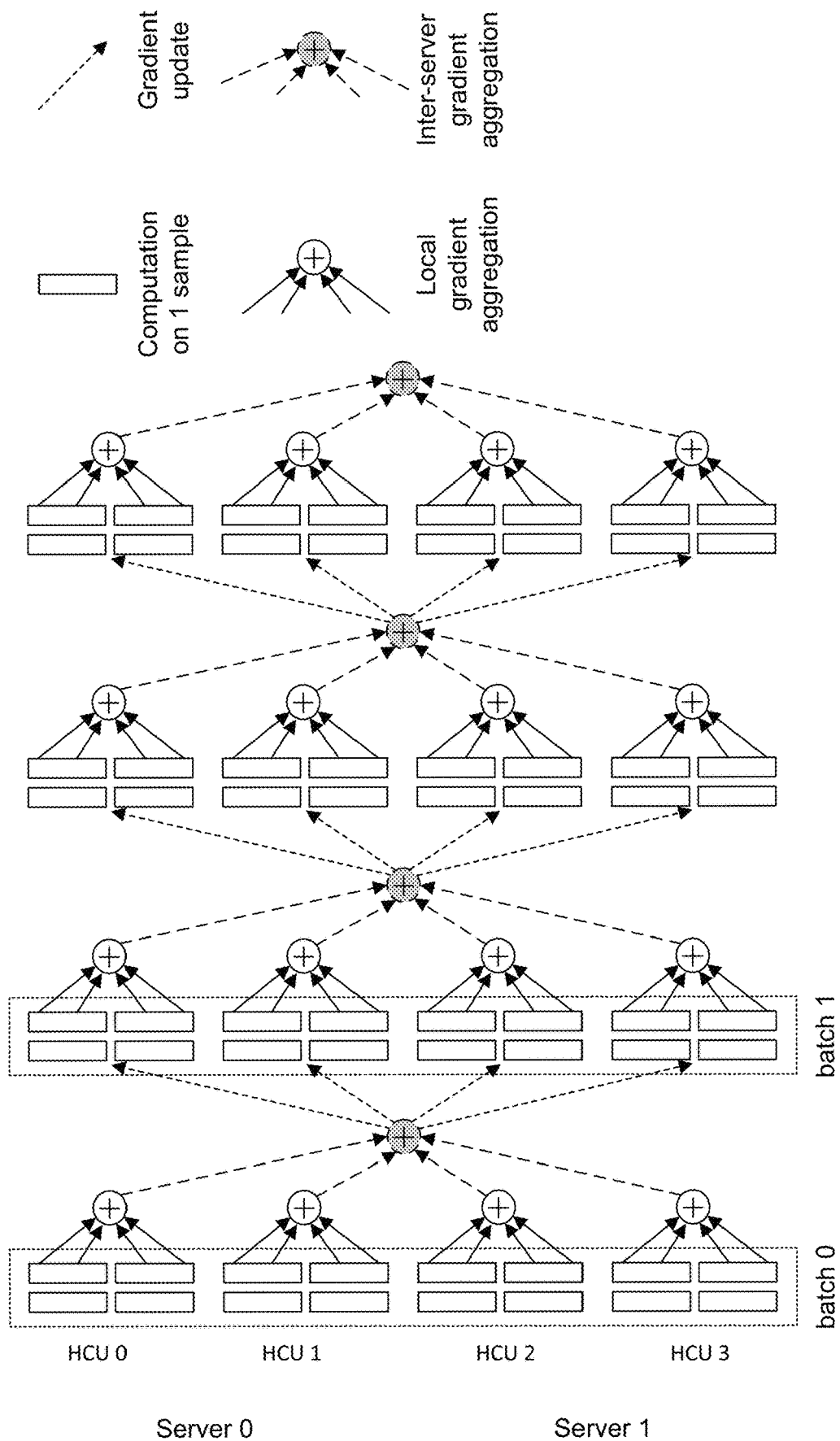
FIG. 4 illustrates a schematic diagram of a first exemplary distributed batch SGD training.

FIG. 4 illustrates a schematic diagram of a first exemplary distributed batch SGD training. As shown in FIG. 4, each batch can include a plurality of samples. The number of samples in one batch is called a batch size. For example, in FIG. 4, each batch includes 16 samples, and accordingly the batch size is 16.

Samples in each batch can be distributed to a plurality of HCUs included on one or more servers. As shown in FIG. 4, for example, there are two servers, server 0 and server 1, each of which include two HCUs, HCUs 0-1 and HCUs 2-3, respectively.

As shown in FIG. 4, a block presents a computation of a HCU on one sample. A short-dash arrow represents a gradient update to a neural network. A combination of solid arrows and a plus sign presents a gradient aggregation on a HCU (hereinafter, also referred to as local gradient aggregation). A combination of long-dash arrows and a plus sign presents a gradient aggregation among HCUs on different servers (hereinafter, also referred to as inter-server gradient aggregation). In general, the gradient aggregation can include summing gradients for different samples (on a same HCU or from different HCUs, from a same server or different servers). Based on the gradient aggregation, a gradient update can be generated from the gradients.

As shown in FIG. 4, a batch 0 of 16 samples are distributed among four HCUs, HCU 0-3, of two servers, server 0 and server 1. Each HCU has a local copy of the neural network with a set of weights. One HCU processes four samples independently, aggregates gradients from the four samples and generates a local aggregated gradient, as indicated by a combination of solid arrows and a plus sign. In some embodiments, gradient aggregation can further occur among different HCUs on a same server or on different servers. For example, as shown in FIG. 4, four local aggregated gradients from local gradient aggregations can be aggregated, and a gradient update can be generated and distributed to each HCU of a subsequent batch. In some embodiments, gradients from different HCUs can be directly aggregated to generate a gradient update, which is distributed to HCUs of the subsequent batch. It is appreciated that the gradient aggregation among different HCUs, e.g., intra-server gradient aggregation or inter-server gradient aggregation, can be implemented by the systems or architectures as shown in FIG. 1A, FIG. 1B, FIG. 2, and FIG. 3.

Upon receiving the gradient update, each HCU can update its local copy of neural network, including updating a set of weights in the neural network. Then, for other batches of 16 samples, the HCUs repeat a process similar to that for batch 0, as shown in FIG. 4.

Figure 5:
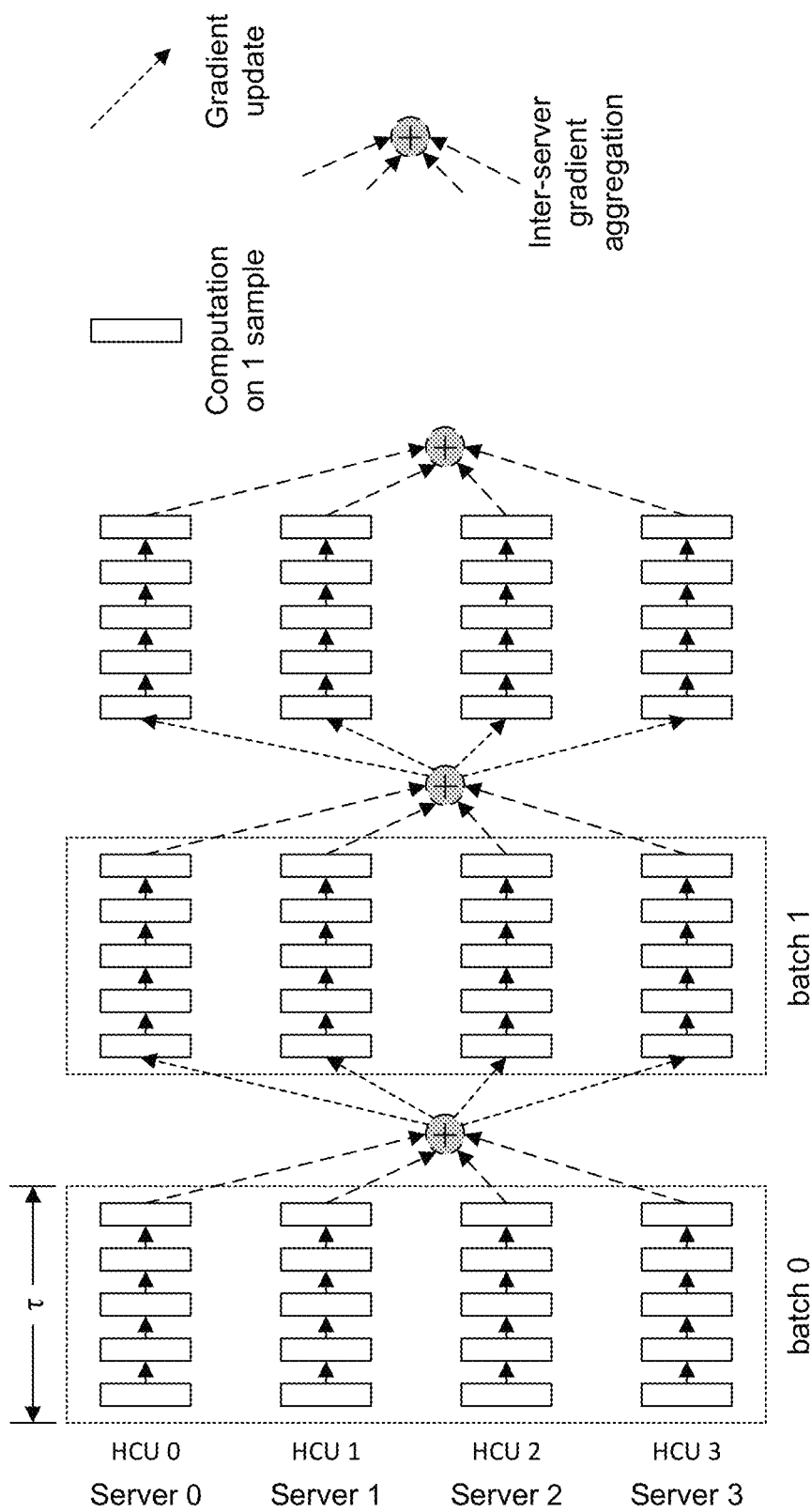
FIG. 5 illustrates a schematic diagram of a second exemplary distributed batch SGD training.

FIG. 5 illustrates a schematic diagram of a second exemplary distributed batch SGD training. In this exemplary distributed batch SGD training, batches with a size of 20 samples are distributed to four servers, server 0-3. Each server has one HCU. In each HCU, a copy of neural network is locally updated after a gradient is available from computation on a previous sample without synchronizing among different HCUs. The local update of neural network continues during a predefined period τ. After predefined period τ, gradients from different HCUs are aggregated across all servers. A gradient update is generated and sent to all HCUs of a subsequent batch. With the gradient update, each HCU of the subsequent batch updates a set of weights in its local copy of neural network and starts processing of samples from a next batch, as shown in FIG. 5.

Figure 6:
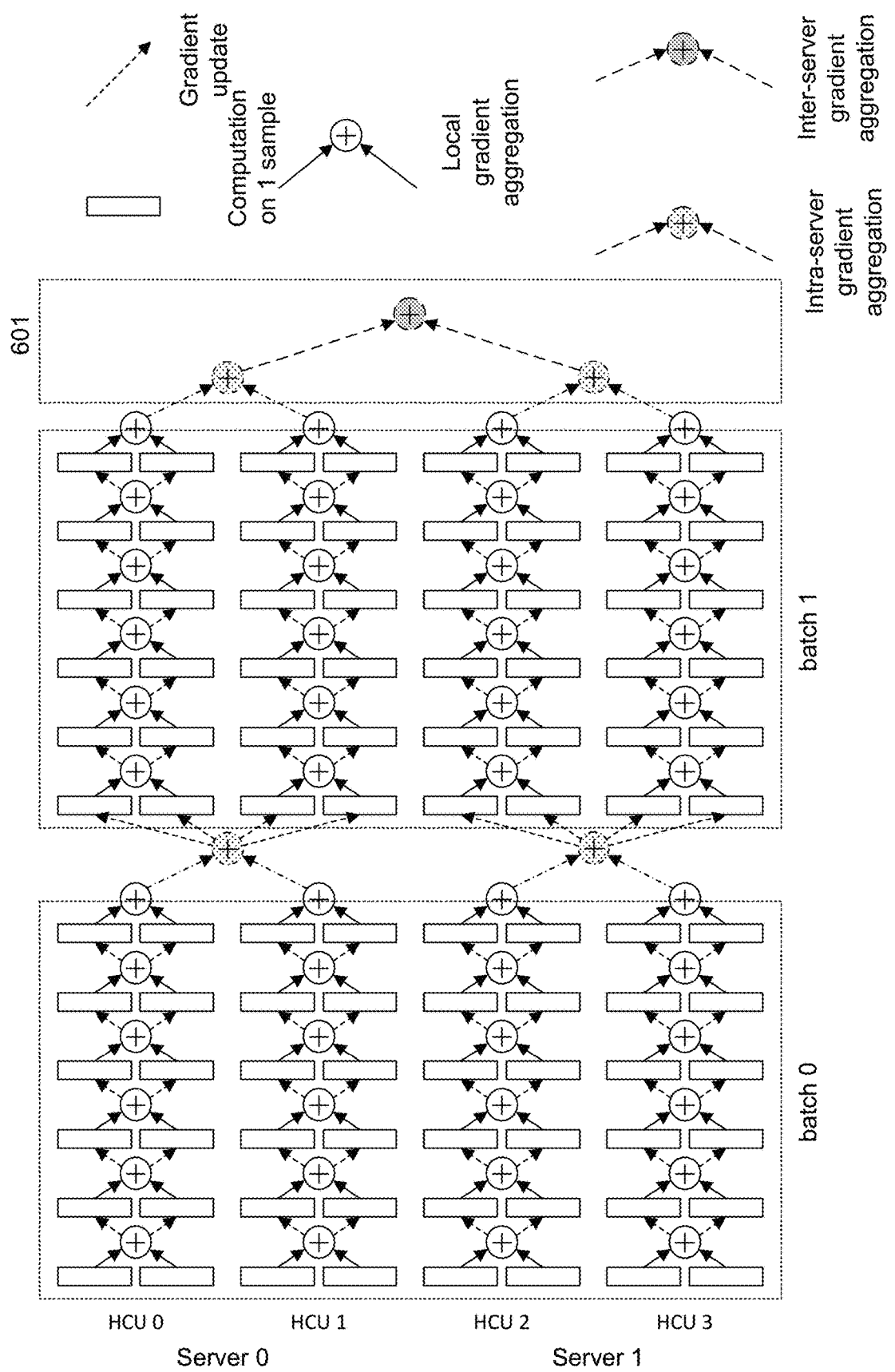
FIG. 6 illustrates a schematic diagram of a third exemplary distributed batch SGD training.

FIG. 6 illustrates a schematic diagram of a third exemplary distributed batch SGD training. This distributed batch SGD training can be referred to as hierarchical SGD training. As shown in FIG. 6, a combination of dot-dash arrows and a plus sign presents a gradient aggregation among different HCUs on a same server (hereinafter, also referred to as intra-server gradient aggregation).

For example, as shown in FIG. 6, batches with a size of 48 samples are distributed to two servers, server 0 and server 1. Each server has two HCUs, HCUs 0-1 and HCUs 2-3. In each HCU, a local gradient aggregation is performed after computation on two samples, indicated by a combination of solid arrows and a plus sign. Then, a copy of neural network is locally updated. HCU continues to process the next two samples and performs a next local gradient aggregation. After all samples from batch 0 are processed, an intra-server gradient aggregation is performed between HCU 0 and HCU 1 or HCU 2 and HCU 3. In each server, two HCUs update their local copies of neural network based on the result of intra-server gradient aggregation, and start processing of next batch, e.g., batch 1.

After all batches are processed, an inter-server gradient aggregation can be performed. For example, as shown in FIG. 6, gradients from different samples are summed on each HCU first. Next, results from local gradient aggregations are summed on each server. Then, results from intra-server gradient aggregations are aggregated to generate a gradient update, as indicated by box 601. The gradient update can be used to update a set of weights in the neural network under training.

In the distributed batch SGD trainings of FIGS. 4-6, as computation tasks are distributed to a plurality of servers (or HCUs), computation time can be reduced, but communication time increases. A large-scale training is bounded to communication. In addition, for intra-server or inter-server gradient aggregation, when a HCU completes computing assigned gradient in a batch, it halts, waiting for synchronization when other HCUs complete their assigned gradient calculations. This can also increase the total training time.

Based on how data is communicated, gradient aggregations and weight-updates may be categorized into three groups:

1) Group 1: local gradient aggregation and weight update. Each HCU calculates and aggregates its local gradients and updates local copy of neural network. The overhead is ignorable because input data is in a local memory of a HCU, which can support high speed access (e.g., memory hierarchy 104 in FIG. 1A).
2) Group 2: intra-server (or neighbour-server) gradient aggregation and weight update. HCUs on the same server and on a small cluster of neighbour servers aggregate gradients and update their copies of neural network. The overhead can bottleneck the training computation, and varies depending on how HCUs are coupled to each other. For example, if HCUs are coupled with high speed serial connections as shown in FIG. 2, the overhead is relatively small, and less than the configuration as shown in FIG. 3, where all of HCUs are coupled directly to network connection.
3) Group 3: inter-server gradient aggregation and weight update. Gradients are aggregated from HCUs of different servers (e.g., all servers) to generate a gradient update. Then the gradient update is sent back to HCUs of these servers (e.g., all servers) to update their copies of neural network. This group tends to have the largest overhead, because gradient aggregation is performed across different servers, and HCUs need to communicate with other HCUs on different servers.

Figure 7:
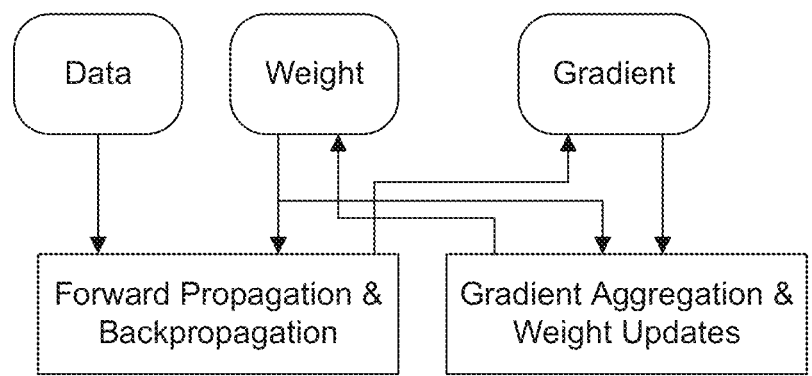
FIG. 7 illustrates a block diagram of an exemplary batch SGD training.

The distributed batch SGD trainings of FIGS. 4-6, can achieve partial parallelism between computation and communication. Since a neural network contains multiple layers, these trainings pipeline gradient computation of a layer in backpropagation with gradient aggregation of previous layers. Thus, a part of backpropagation is parallelized with gradient communication. FIG. 7 schematically illustrates a diagram where computation is partially parallel with communication.

Figure 8:
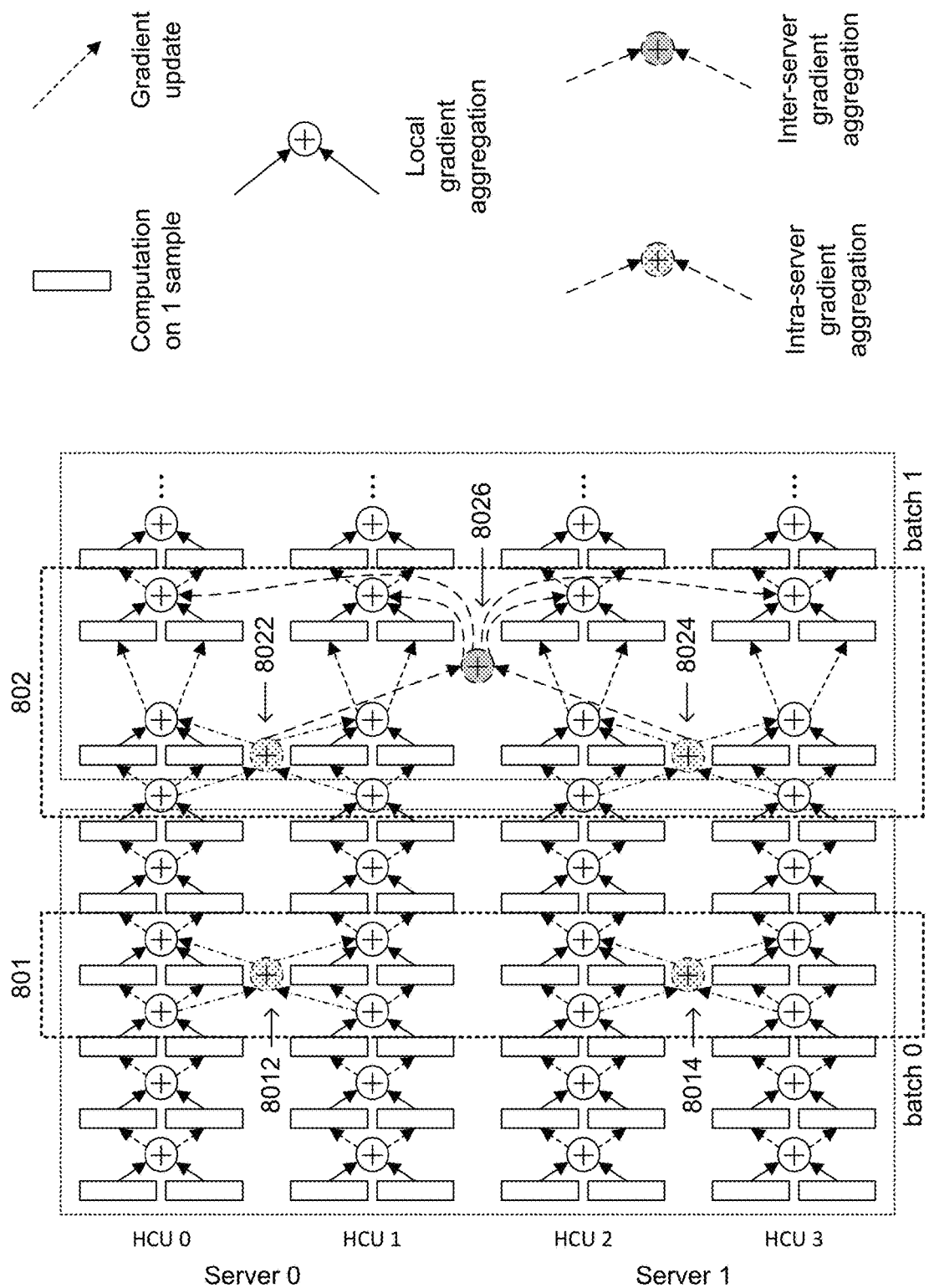
FIG. 8 illustrates a schematic diagram of a fourth exemplary distributed batch SGD training, according to some embodiments of the disclosure.

FIG. 8 illustrates a schematic diagram of a fourth exemplary distributed batch SGD training, according to some embodiments of the disclosure. As shown in FIG. 8, batches with sizes of 48 samples are distributed to two servers, server 0 and server 1. Each server has two HCUs, HCUs 0-1 and HCUs 2-3. In each HCU, a local gradient aggregation is performed after computation on two samples, indicated by a combination of a solid arrow and a plus sign. Then, a local copy of neural network is locally updated. Each HCU continues to process the next two samples and perform next local gradient aggregation.

In some embodiments, Group 2 (intra-server or neighbour-server) gradient aggregation can be performed in parallel with computation on a sample and local gradient aggregation. For example, in block 801 of FIG. 8, intra-server gradient aggregations 8012 and 8014 are performed between HCU 0 and HCU 1 and between HCU 2 and HCU 3, respectively. The intra-server gradient aggregations 8012 and 8014 can include summing the results of local gradient aggregations of HCUs 0-1 and HCUs 2-3, respectively. Alternatively, the intra-server gradient aggregations 8012 and 8014 can include summing gradients communicated from HCUs 0-1 and HCUs 2-3, respectively. During the intra-server gradient aggregations 8012 and 8014, HCUs 0-3 continue computations on new samples and generate new gradients. Then, for HCUs 0-1 and HCUs 2-3, results of intra-server gradient aggregations 8012 and 8014, respectively, can be distributed to each HCU, and locally aggregated with its local gradient aggregations. This aggregation can include summing the result of intra-server gradient aggregation with generated new gradients. Therefore, the intra-server gradient aggregation is in parallel with computation on new samples and local gradient aggregations.

In some embodiments, Group 3 (inter-server gradient aggregation) can be performed in parallel with computation on a sample and local gradient aggregation. For example, in an implementation, inter-server gradient aggregation can be decomposed to Group 2 gradient aggregations and an additional aggregation among servers. In block 802 of FIG. 8, intra-server gradient aggregations 8022 and 8024 are performed between HCU 0 and HCU 1 on server 0 and between HCU 2 and HCU 3 on server 1, respectively, as indicated by a combination of dot-dash arrows and a plus sign. The result of the intra-server gradient aggregations 8022 and 8024 can be distributed to each HCU on the same server and aggregated with its later local gradient aggregations. Moreover, the results of intra-server gradient aggregations 8022 and 8024 for HCUs 0-1 on server 0 and HCUs 2-3 on server 1, respectively, can also be aggregated, indicated by a combination of long-dash arrows and a plus sign, to perform an inter-server gradient aggregation 8026. The inter-server gradient aggregation 8026 can include summing the results of intra-server gradient aggregations 8022 and 8024. During the inter-server gradient aggregation 8026, HCUs 0-3 continue computations on new samples. Then, for HCUs 0-3, a result of inter-server gradient aggregation 8026 can be distributed to each HCU and aggregated with its local gradient aggregation.

In another implementation, inter-server gradient aggregation can be performed on HCUs 0-1 of server 0 and HCUs 2-3 of server 1 without involving intra-server gradient aggregations 8022 and 8024. The inter-server gradient aggregation can include aggregating (e.g., summing) results of local gradient aggregations of HCUs 0-3. During the inter-server gradient aggregation, HCUs 0-3 continue computations on new samples. Then, a result of inter-server gradient aggregation can be distributed to each HCU and aggregated with its local gradient aggregation. Therefore, the inter-server gradient aggregation is in parallel with computations on new samples and local gradient aggregations.

It is appreciated that, although FIG. 8 illustrates intra-server gradient aggregation is in parallel with computation of one sample on each of HCUs 0-3 and inter-server gradient aggregation is in parallel with computation on two samples in each of HCUs 0-3, Group 2 or Group 3 gradient aggregation can be parallelized with computation of any number of samples on HCU.

Therefore, Group 2 gradient aggregation among HCUs on a same server or among neighbour servers and Group 3 gradient aggregation among HCUs on different servers can be hidden while the HCUs work on next round(s) of samples. In some embodiments, the distributed batch SGD training is implemented by system 200 of FIG. 2 or system 300 of FIG. 3. Communication time for Group 2 gradient aggregation may be reasonably small and less than the processing time of one round of samples. The result of Group 2 gradient aggregation is available at the end of processing one round of samples, and can be aggregated with a new set of local gradients. In some embodiments, Group 2 gradient aggregation can be delayed for only one sample and may not have a substantial influence on statistical quality of overall SGD. Similarly, for Group 3 gradient aggregation, it may also be parallelized with computations on new samples. The communication overhead for Group 2 or Group 3 gradient aggregation is hidden along with the computation. Further, frequent aggregation of new local gradients with Group 3 gradient aggregation can improve statistical quality of SGD.

In some embodiment, the HCU is based on Application Specific Integrated Circuit (ASIC), which has a predictable execution latency. Therefore, the latency of Group 2 or Group 3 gradient aggregation can be more predictable. This predictability can be utilized to design a SGD training mechanism, which can improve resource utilization.

It is appreciated that, embodiments of the disclosure can be implemented with any configuration of hierarchical SGD, any batch size, any number of servers, any grouping of servers, any number of HCUs, any configuration of server or HCU, any network topology or configuration of implementation system.

For example, some embodiments of the disclosure can be implemented with the distributed configuration of FIG. 4. An inter-server gradient aggregation can include aggregating (e.g., summing) results of local gradient aggregations of HCUs 0-3, as shown in FIG. 4. Alternatively, inter-server gradient aggregation can be divided to decompose to intra-server gradient aggregations and an additional aggregation among servers, similarly to block 802 of FIG. 8. During inter-server gradient aggregation, HCUs 0-3 continue instead of stopping, computations on new samples. Then, a result of inter-server gradient aggregation can be distributed to each HCU and aggregated with its local gradient aggregation. Therefore, the inter-server gradient aggregation is in parallel with computations on new samples.

Some embodiments of the disclosure can be implemented with the distributed configuration of FIG. 5. An inter-server gradient aggregation can include aggregating (e.g., summing) local gradient updates of HCUs 0-3, as shown in FIG. 5. During inter-server gradient aggregation, HCUs 0-3 continue, instead of stopping, computations on new samples. Then, a result of inter-server gradient aggregation can be distributed to each HCU and aggregated with its new local gradient. Therefore, the inter-server gradient aggregation is in parallel with computations on new samples.

Figure 9:
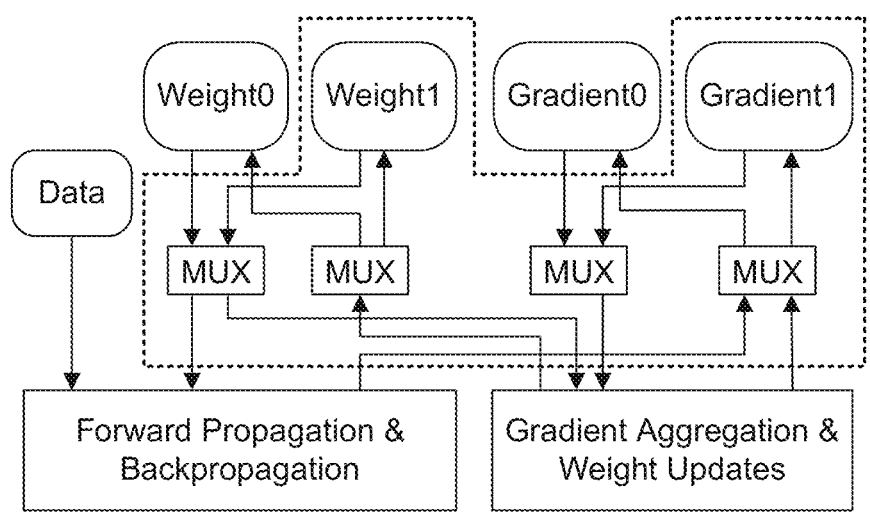
FIG. 9 illustrates a block diagram of another exemplary batch SGD training, according to some embodiments of the present disclosure.

In some embodiments, Group 2 or Group 3 gradient aggregation and weight update are parallelized with computations in both forward propagation and backpropagation. A schematic diagram of an exemplary batch SGD training is shown in FIG. 9, where the communication is in parallel with computation in both forward propagation and backpropagation. This schematic diagram can be implemented by the systems or architectures as shown in FIG. 1A, FIG. 1B, FIG. 2, and FIG. 3.

A backpropagation task may modify gradients while a gradient aggregation task reads them, and a forward propagation task may read weights while a weight update task changes them. In some embodiments, a HCU can include a plurality of buffers and a plurality of multiplexers. The buffer can be used to buffer a gradient or a weight. The multiplexer can be communicatively coupled to the buffers, and multiplex gradients or weights in the plurality of buffers.

As shown in FIG. 9, for example, four buffers (a buffer for each of weights 0-1 and gradients 0-1) and four multiplexers (indicated by "MUX" in FIG. 9) are added on their data paths for multiplexing the weights and gradients in the four buffers. The buffer can store a gradient or a weight. For example, weight0 buffer and weight1 buffer can store weights, and gradient0 buffer and gradient1 buffer can store gradients. The multiplexers are programmable. For example, the multiplexers can be programmed such that a computation on a new sample can use weight0 and gradient0 buffers and the gradient aggregation can use weight1 and gradient1 buffers. After computation and gradient aggregation both complete, the multiplexers can be programmed to switch such that a computation can use weight1 and gradient1 buffers and the gradient aggregation can use weight0 and gradient0 buffers. The buffers and multiplexers can facilitate the parallelization between the Group 2 or Group 3 gradient aggregations and computations in both forward propagation and backpropagation. For example, for intra-server gradient aggregation 8012 in block 801 of FIG. 8, the result of intra-server gradient aggregation 8012 can be distributed to HCU 0 and HCU 1. HCU 0 and HCU 1 can store, using the multiplexer, the result of intra-server gradient aggregation 8012 in their gradient1 buffers as shown in FIG. 9. During the intra-server gradient aggregation 8012, HCUs 0-1 continue computations on new samples and generate new gradients. The use of multiplexers allows new gradients to be stored in their corresponding gradient0 buffers. Each of HCUs 0-1 can read gradients from gradient buffers 0-1, and can locally aggregate the gradients to generate weight updates. The weight update can be stored in weight1 buffer. Therefore, the intra-server gradient aggregation can be performed in parallel with computations on new samples. Similarly, the configuration in FIG. 9 can also facilitate inter-server gradient aggregation 8026 in block 802 of FIG. 8.

Figure 10:
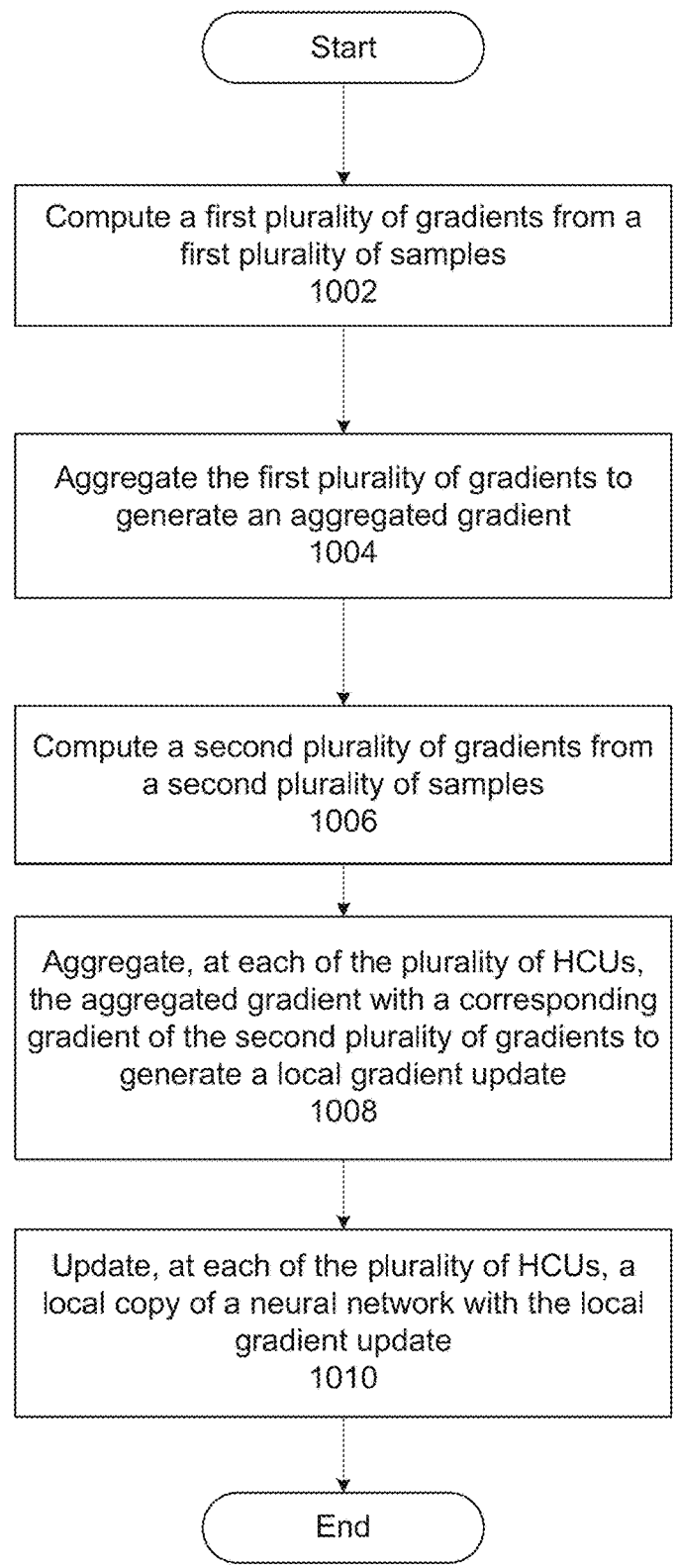
FIG. 10 illustrates a flow diagram of an exemplary method for neural network training, according to some embodiments of the present disclosure.

FIG. 10 illustrates a flow diagram of an exemplary method 1000 for neural network training, according to some embodiments of the present disclosure. The method 1000 can be implemented by the systems or architectures as shown in FIG. 1A, FIG. 1B, FIG. 2, and FIG. 3. Moreover, method 1000 can also be implemented by a computer program product, embodied in a computer-readable medium, including computer-executable instructions, such as program code, executed by computers, such as the systems or architectures as shown in FIG. 1A, FIG. 1B, FIG. 2, and FIG. 3. In some embodiments, a host unit (e.g., host unit 120 of FIG. 1A) may compile software code for generating instructions for providing to one or more HCUs (e.g. accelerators) to perform method 1000.

At step 1002, a first plurality of gradients can be computed from a first plurality of samples. In some embodiment, a plurality of HCUs in a neural network processing system can perform computation on the first plurality of samples to generate the first plurality of gradients.

At step 1004, the first plurality of gradients can be aggregated to generate an aggregated gradient. The aggregation can be performed by the HCUs or a host unit coupled to the HCUs, e.g., host unit 120 of FIG. 1A-1B, host unit 2024 of FIG. 2, or host unit 3024 of FIG. 3. The aggregation can include summing the first plurality of gradients to generate an aggregated gradient. In some embodiments, the aggregation can include aggregating, at each of the plurality of HCUs, a plurality of local gradients of that HCU to generate a local aggregated gradient. The local aggregated gradients from the plurality of HCUs can be further aggregated. For example, as shown in block 801 of FIG. 8, intra-server gradient aggregations 8012 and 8014 can include aggregating (e.g. summing) the results of local gradient aggregations of HCUs 0-1 and HCUs 2-3, respectively.

In some embodiments, the plurality of HCUs are in different groups. The aggregation can include aggregating, for each group of HCUs, the local aggregated gradients from HCUs of that group to generate an intra-group aggregated gradient, and aggregating the intra-group aggregated gradients of two or more groups. Each group of HCUs can be on a server of the neural network processing system. For example, as shown in block 802 of FIG. 8, intra-server gradient aggregations 8022 and 8024 are performed between HCU 0 and HCU 1 on server 0 and between HCU 2 and HCU 3 on server 1, respectively. The results of intra-server gradient aggregations 8022 and 8024 for HCUs 0-1 on server 0 and HCUs 2-3 on server 1, respectively, can be aggregated to perform an inter-server gradient aggregation 8026.

At step 1006, a second plurality of gradients can be computed from a second plurality of samples. In some embodiments, block 1006 can be performed in parallel with block 1004. For example, as shown in block 801 of FIG. 8, during intra-server gradient aggregations 8012 and 8014, each of HCUs 0-3 performs computations on two new samples and generates two new gradients. As shown in block 802 of FIG. 8, during Group 3 gradient aggregation, including intra-server gradient aggregations 8022 and 8024 and inter-server gradient aggregation 8026, each of HCUs 0-3 performs computations on four new samples and generates four new gradients.

At step 1008, at each of the plurality of HCUs, the aggregated gradient can be aggregated with a corresponding gradient of the second plurality of gradients to generate a local gradient update. For example, each HCU can locally sum the aggregated gradient with its gradient of the second plurality of gradients to generate its local gradient update. For example, as shown in block 801 of FIG. 8, results of intra-server gradient aggregations 8012 and 8014 are locally aggregated with new gradients at each of HCUs 0-1 and each of HCUs 2-3, respectively. As shown in block 802 of FIG. 8, the result of Group 3 gradient aggregation (including intra-server gradient aggregations 8022 and 8024 and inter-server gradient aggregation 8026) is locally aggregated with new gradients at each of HCUs 0-4.

At step 1010, at each of the plurality of HCUs, a local copy of a neural network can be updated with the local gradient update. For example, each HCUs can locally update a set of weights in its local copy of neural network with its local gradient update.

In some embodiments, the plurality of HCUs can compute a third plurality of gradients from a third plurality of samples. Each HCU can aggregate the intra-group aggregated gradient with its gradient of the third plurality of gradients to generate a local gradient update. Then, a local copy of a neural network at each of the plurality of HCUs can be updated with the local gradient update.

Embodiments of the disclosure can bring many technical advantages. For example, some embodiments of the disclosure can satisfy the requirement of synchronous gradient aggregations while also relaxing timing requirements for weight updates. Therefore, this can overcome a major performance bottleneck, and enable better parallelization between computation and communication in distributed neural network training.

Some embodiments of the disclosure propose a flexible, hierarchical, and finer grained mechanism of weight update. In these embodiments, more frequent weight updates result in better statistical quality for SGD than hierarchical SGD.

In some embodiments, HCUs can be implemented by a high-performance ASIC. The execution latency of these HCUs is predictable, effectively improving resource utilization.

In some embodiments, the amount of delay on weight updates to a local copy of neural network is determined by communication overhead and is predictable for a given neural network. This delay amount also determines how far local weight updates may diverge from original weights when gradients are aggregated. Therefore, the statistical quality bound can be predicted based on the delay amount.

As compared to asynchronous SGD, the system of some embodiments of the disclosure update the neural network (e.g., weights) in a distributed fashion (avoiding parameter servers and their overheads) and uses more restrictive timing requirements that result in better statistical quality on SGD.

The embodiments of the disclosure can be applied to many products, environments, and scenarios. For example, some embodiments of the disclosure can be applied to Ali-NPU, Ali-Cloud, Ali-DPU (Database Acceleration Unit), Ali-AI platform, GPU, TPU, or the like.

The various example embodiments described herein are described in the general context of method steps or processes, which may be implemented in one aspect by a computer program product, embodied in a computer readable medium, including computer-executable instructions, such as program code, executed by computers in networked environments. A computer readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments may further be described using the following clauses:

1. A method implemented by a neural network processing system, the neural network processing system comprising a plurality of heterogeneous computation units (HCUs), the method comprising:
   computing, by the plurality of HCUs, a first plurality of gradients from a first plurality of samples;
   aggregating the first plurality of gradients to generate an aggregated gradient;
   computing, by the plurality of HCUs, a second plurality of gradients from a second plurality of samples;
   aggregating, at each of the plurality of HCUs, the aggregated gradient with a corresponding gradient of the second plurality of gradients to generate a local gradient update; and
   updating, at each of the plurality of HCUs, a local copy of a neural network with the local gradient update.
2. The method of clause 1, wherein aggregating the first plurality of gradients to generate an aggregated gradient comprising:
   aggregating, at each of the plurality of HCUs, a plurality of local gradients of that HCU to generate a local aggregated gradient.
3. The method of clause 2, wherein aggregating the first plurality of gradients to generate an aggregated gradient comprising:
   aggregating the local aggregated gradients from the plurality of HCUs.
4. The method of clause 2, wherein the plurality of HCUs are in different groups, and wherein aggregating the first plurality of gradients to generate an aggregated gradient comprises:
   aggregating, for each group of HCUs, the local aggregated gradients from HCUs of that group to generate an intra-group aggregated gradient; and
   aggregating the intra-group aggregated gradients of two or more groups.
5. The method of clause 4, further comprising:
   computing, by the plurality of HCUs, a third plurality of gradients from a third plurality of samples;
   aggregating, at each of the plurality of HCUs, the intra-group aggregated gradient with a corresponding gradient of the third plurality of gradients to generate a second local gradient update; and
   updating, at each of the plurality of HCUs, a local copy of a neural network with the second local gradient update.
6. The method of clause 4 or clause 5, wherein the neural network processing system comprises a plurality of servers, and each server comprises a group of HCUs.
7. The method of any of clauses 1-6, wherein aggregating the first plurality of gradients comprises: summing the first plurality of gradients, and
   wherein aggregating, at each of the plurality of HCUs, the aggregated gradient with the corresponding gradient of the second plurality of gradients comprises: summing, at each of the plurality of HCUs, the aggregated gradient with the corresponding gradient of the second plurality of gradients.
8. The method of any of clauses 1-7, wherein aggregating the first plurality of gradients to generate the aggregated gradient is performed in parallel with computing the second plurality of gradients from the second plurality of samples.
9. A neural network processing system, comprising:
   a network connection; and
   a plurality of heterogeneous computation units (HCUs) communicatively coupled to the network connection, the plurality of HCUs being configured to:
   compute a first plurality of gradients from a first plurality of samples, wherein the first plurality of gradients are aggregated to generate an aggregated gradient;
   compute a second plurality of gradients from a second plurality of samples;
   aggregate, at each of the plurality of HCUs, the aggregated gradient with a corresponding gradient of the second plurality of gradients to generate a local gradient update; and
   update, at each of the plurality of HCUs, a local copy of a neural network with the local gradient update.
10. The neural network processing system of clause 9, wherein the plurality of HCUs are further configured to:
    aggregate, at each of the plurality of HCUs, a plurality of local gradients of that HCU to generate a local aggregated gradient.
11. The neural network processing system of clause 10, wherein the plurality of HCUs are further configured to:
    aggregate the local aggregated gradients from the plurality of HCUs.
12. The neural network processing system of clause 10, wherein the plurality of HCUs are in different groups, and wherein the plurality of HCUs are further configured to:
    aggregate, for each group of HCUs, the local aggregated gradients from HCUs of that group to generate an intra-group aggregated gradient; and
    aggregate the intra-group aggregated gradients of two or more groups.
13. The neural network processing system of clause 12, wherein the plurality of HCUs are further configured to:
    compute a third plurality of gradients from a third plurality of samples;
    aggregate, at each of the plurality of HCUs, the intra-group aggregated gradient with corresponding gradient of the third plurality of gradients to generate a second local gradient update; and
    updating, at each of the plurality of HCUs, a local copy of a neural network with the second local gradient update.
14. The neural network processing system of any one of clauses 9-13, further comprising:
    a plurality of servers, each server comprising a group of HCUs, and
    wherein the HCUs on the same server are communicatively coupled as a ring.
15. The neural network processing system of any of clauses 9-14, wherein the HCU comprises:
    a memory for storing data;
    a computing unit communicatively coupled to the memory, the computing unit being configured to perform a computation or aggregation of gradients;
    an interconnect unit configured to send and receive data and instructions; and a controller configured to control operations of the computing unit and the interconnect unit.

16. The neural network processing system of any of clauses 9-15, wherein the HCU comprises:
a plurality of buffers configured to buffer a gradient and a weight;
a plurality of multiplexers communicatively coupled to the plurality of buffers and configured to multiplex the gradient and weight in the plurality of buffers.

17. The neural network processing system of any of clauses 9-16, wherein the aggregation of the first plurality of gradients to generate an aggregated gradient is performed in parallel with computation of a second plurality of gradients from a second plurality of samples.

18. A non-transitory computer readable storage media storing a set of instructions that are executable by one or more processing devices in a neural network processing system comprising a plurality of heterogeneous computation units (HCUs) to cause the neural network processing system to perform a method comprising:
computing a first plurality of gradients from a first plurality of samples;
aggregating the first plurality of gradients to generate an aggregated gradient;
computing a second plurality of gradients from a second plurality of samples;
aggregating, at each of the plurality of HCUs, the aggregated gradient with a corresponding gradient of the second plurality of gradients to generate a local gradient update; and
updating, at each of the plurality of HCUs, a local copy of a neural network with the local gradient update.

19. The non-transitory computer readable storage media of clause 18, wherein aggregating the first plurality of gradients to generate an aggregated gradient comprising:
aggregating, at each of the plurality of HCUs, a plurality of local gradients of that HCU to generate a local aggregated gradient.

20. The non-transitory computer readable storage media of clause 19, wherein aggregating the first plurality of gradients to generate an aggregated gradient comprising:
aggregating the local aggregated gradients from the plurality of HCUs.

21. The non-transitory computer readable storage media of clause 19, wherein the plurality of HCUs are in different groups, and wherein aggregating the first plurality of gradients to generate an aggregated gradient comprises:
aggregating, for each group of HCUs, the local aggregated gradients from HCUs of that group to generate an intra-group aggregated gradient; and
aggregating the intra-group aggregated gradients of two or more groups.

22. The non-transitory computer readable storage media of clause 21, wherein the set of instructions that are executable by the one or more processing devices to further cause the neural network processing system to perform:
computing a third plurality of gradients from a third plurality of samples;
aggregating, at each of the plurality of HCUs, the intra-group aggregated gradient with a corresponding gradient of the third plurality of gradients to generate a second local gradient update; and
updating, at each of the plurality of HCUs, a local copy of a neural network with the second local gradient update.

23. The non-transitory computer readable storage media of any of clauses 18-22, wherein aggregating the first plurality of gradients comprises: summing the first plurality of gradients, and
wherein aggregating, at each of the plurality of HCUs, the aggregated gradient with the corresponding gradient of the second plurality of gradients comprises: summing, at each of the plurality of HCUs, the aggregated gradient with the corresponding gradient of the second plurality of gradients.

24. The non-transitory computer readable storage media of any of clauses 18-23, wherein aggregating the first plurality of gradients to generate an aggregated gradient is in parallel with computing a second plurality of gradients from a second plurality of samples.

25. A terminal, comprising:
a host unit; and
a plurality of heterogeneous computation units (HCUs) communicatively coupled to the host unit, the plurality of HCUs being configured to:
compute a first plurality of gradients from a first plurality of samples, wherein the first plurality of gradients are aggregated to generate an aggregated gradient;
compute a second plurality of gradients from a second plurality of samples;
aggregate, at each of the plurality of HCUs, the aggregated gradient with a corresponding gradient of the second plurality of gradients to generate a local gradient update; and
update, at each of the plurality of HCUs, a local copy of a neural network with the local gradient update.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In the foregoing specification, embodiments have been described with reference to numerous specific details that may vary from implementation to implementation. Certain adaptations and modifications of the described embodiments may be made. Other embodiments may be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art may appreciate that these steps may be performed in a different order while implementing the same method.

In the drawings and specification, there have been disclosed exemplary embodiments. However, many variations and modifications may be made to these embodiments. Accordingly, although specific terms are employed, they are used in a generic and descriptive sense only and not for purposes of limitation, the scope of the embodiments being defined by the following claims.

The invention claimed is:

1. A method implemented by a neural network processing system, the neural network processing system comprising a plurality of heterogeneous computation units (HCUs), the method comprising:
computing, by the plurality of HCUs, a plurality of first gradients from a plurality of first samples;
aggregating the plurality of first gradients to generate an aggregated gradient;
computing, by the plurality of HCUs, a plurality of second gradients from a plurality of second samples;
aggregating, at each of the plurality of HCUs, the aggregated gradient of the plurality of first gradients with the each HCU's corresponding second gradient among the second plurality of second gradients to generate a local gradient update for the each HCU; and
updating, at each of the plurality of HCUs, a local copy of a neural network with the corresponding local gradient update for the each HCU.

2. The method of claim 1, wherein aggregating the first plurality of first gradients to generate an aggregated gradient comprising:
aggregating, at each of the plurality of HCUs, a plurality of local gradients of that HCU to generate a local aggregated gradient.

3. The method of claim 2, wherein aggregating the plurality of first gradients to generate an aggregated gradient comprising:
aggregating the local aggregated gradients from the plurality of HCUs.

4. The method of claim 2, wherein the plurality of HCUs are in different groups, and wherein aggregating the plurality of first gradients to generate an aggregated gradient comprises:
aggregating, for each group of HCUs, the local aggregated gradients from HCUs of that group to generate an intra-group aggregated gradient; and
aggregating the intra-group aggregated gradients of two or more groups.

5. The method of claim 4, further comprising:
computing, by the plurality of HCUs, a plurality of third gradients from a plurality of third samples;
aggregating, at each of the plurality of HCUs, the intra-group aggregated gradient with the each HCU's corresponding third gradient of the plurality of third gradients to generate a second local gradient update; and
updating, at each of the plurality of HCUs, a local copy of a neural network with the corresponding second local gradient update.

6. The method of claim 1, wherein aggregating the plurality of first gradients to generate the aggregated gradient is performed in parallel with computing the plurality of second gradients from the plurality of second samples.

7. A neural network processing system, comprising:
a network connection; and
a plurality of heterogeneous computation units (HCUs) each comprising a computing unit and communicatively coupled to the network connection, the plurality of HCUs being configured to:
compute a plurality of first gradients from a plurality of first samples, wherein the plurality of first gradients are aggregated to generate an aggregated gradient;
compute a plurality of second gradients from a plurality of second samples;
aggregate, at each of the plurality of HCUs, the aggregated gradient of the plurality of first gradients with the each HCU's corresponding second gradient among the plurality of second gradients to generate a local gradient update for the each HCU; and
update, at each of the plurality of HCUs, a local copy of a neural network with the corresponding local gradient update for the each HCU.

8. The neural network processing system of claim 7, wherein the plurality of HCUs are further configured to:
aggregate, at each of the plurality of HCUs, a plurality of local gradients of that HCU to generate a local aggregated gradient.

9. The neural network processing system of claim 8, wherein the plurality of HCUs are further configured to:
aggregate the local aggregated gradients from the plurality of HCUs.

10. The neural network processing system of claim 8, wherein the plurality of HCUs are in different groups, and wherein plurality of HCUs are further configured to:
aggregate, for each group of HCUs, the local aggregated gradients from HCUs of that group to generate an intra-group aggregated gradient; and
aggregate the intra-group aggregated gradients of two or more groups.

11. The neural network processing system of claim 10, wherein plurality of HCUs are further configured to:
compute a plurality of third gradients from a plurality of third samples;
aggregate, at each of the plurality of HCUs, the intra-group aggregated gradient with the each HCU's corresponding third gradient of the plurality of third gradients to generate a second local gradient update; and
update, at each of the plurality of HCUs, a local copy of a neural network with the corresponding second local gradient update.

12. The neural network processing system of claim 7, wherein the HCU comprises:
a memory for storing data and communicatively coupled to the computing unit, the computing unit being configured to perform a computation or aggregation of gradients;
an interconnect unit configured to send and receive data and instructions; and
a controller configured to control operations of the computing unit and the interconnect unit.

13. The neural network processing system of claim 7, wherein the HCU comprises:
a plurality of buffers configured to buffer a gradient and a weight;
a plurality of multiplexers communicatively coupled to the plurality of buffers and configured to multiplex the gradient and weight in the plurality of buffers.

14. The neural network processing system of claim 7, wherein the aggregation of the plurality of first gradients to generate an aggregated gradient is performed in parallel with computation of the plurality of second gradients from the plurality of second samples.

15. A non-transitory computer readable storage media storing a set of instructions that are executable by one or more processing devices in a neural network processing system comprising a plurality of heterogeneous computation units (HCUs) to cause the neural network processing system to perform a method comprising:
computing a plurality of first gradients from a plurality of first samples;
aggregating the plurality of first gradients to generate an aggregated gradient;
computing a plurality of second gradients from a plurality of second samples;

aggregating, at each of the plurality of HCUs, the aggregated gradient of the plurality of first gradients with the each HCU's corresponding second gradient among the plurality of second gradients to generate a local gradient update for the each HCU; and updating, at each of the plurality of HCUs, a local copy of a neural network with the corresponding local gradient update for the each HCU.

16. The non-transitory computer readable storage media of claim 15, wherein aggregating the first plurality of first gradients to generate an aggregated gradient comprising:

aggregating, at each of the plurality of HCUs, a plurality of local gradients of that HCU to generate a local aggregated gradient.

17. The non-transitory computer readable storage media of claim 16, wherein aggregating the plurality of first gradients to generate an aggregated gradient comprising:

aggregating the local aggregated gradients from the plurality of HCUs.

18. The non-transitory computer readable storage media of claim 16, wherein the plurality of HCUs are in different groups, and wherein aggregating the plurality of first gradients to generate an aggregated gradient comprises:

aggregating, for each group of HCUs, the local aggregated gradients from HCUs of that group to generate an intra-group aggregated gradient; and aggregating the intra-group aggregated gradients of two or more groups.

19. The non-transitory computer readable storage media of claim 18, wherein the set of instructions that are executable by the one or more processing devices to further cause the neural network processing system to perform:

computing a plurality of third gradients from a plurality of third samples;

aggregating, at each of the plurality of HCUs, the intra-group aggregated gradient with the each HCU's corresponding third gradient of the plurality of third gradients to generate a second local gradient update; and updating, at each of the plurality of HCUs, a local copy of a neural network with the corresponding second local gradient update.

20. The non-transitory computer readable storage media of claim 15, wherein aggregating the plurality of first gradients to generate an aggregated gradient is in parallel with computing the plurality of second gradients from the plurality of second samples.

21. A terminal, comprising:

a host unit; and a plurality of heterogeneous computation units (HCUs) communicatively coupled to the host unit, the plurality of HCUs being configured to:

compute a plurality of first gradients from a plurality of first samples, wherein the plurality of first gradients are aggregated to generate an aggregated gradient;

compute a plurality of second gradients from a plurality of second samples;

aggregating, at each of the plurality of HCUs, the aggregated gradient of the plurality of first gradients with the each HCU's corresponding second gradient among the plurality of second gradients to generate a gradient update for the each HCU; and update, at each of the plurality of HCUs, a local copy of a neural network with the corresponding local gradient update for the each HCU.

* * * * *